US010102629B1

(12) United States Patent
Li (10) Patent No.: US 10,102,629 B1
(45) Date of Patent: Oct. 16, 2018

(54) DEFINING AND/OR APPLYING A PLANAR MODEL FOR OBJECT DETECTION AND/OR POSE ESTIMATION

(71) Applicant: X Development LLC, Mountain View, CA (US)

(72) Inventor: Wen Li, San Jose, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 491 days.

(21) Appl. No.: 14/850,913

(22) Filed: Sep. 10, 2015

(51) Int. Cl.
*G06K 9/00* (2006.01)
*G06T 7/00* (2017.01)

(52) U.S. Cl.
CPC ........ *G06T 7/0046* (2013.01); *G06K 9/00201* (2013.01); *G06K 9/00664* (2013.01); *G06T 7/0057* (2013.01); *G06T 2207/10028* (2013.01); *G06T 2207/30164* (2013.01); *Y10S 901/01* (2013.01); *Y10S 901/02* (2013.01); *Y10S 901/47* (2013.01)

(58) Field of Classification Search
None
See application file for complete search history.

(56) References Cited

U.S. PATENT DOCUMENTS

2010/0042382 A1* 2/2010 Marsh .................. G06T 7/0006
703/1

OTHER PUBLICATIONS

Oswald et al., ("Autonomous Climbing of Spiral Staircases with Humanoids"), 2011 IEEE/RSJ International Conference on Intelligent Robots and Systems, Sep. 25-30, 2011.*
Yang, M. Y., & Förstner, W. (Jan. 2010). Plane Detection in Point Cloud Data. In Proceedings of the 2nd int conf on machine control guidance, Bonn (vol. 1, pp. 95-104).
Oßwald, S., Gutmann, J. S., Hornung, A., & Bennewitz, M. (Oct. 2011). From 3D Point Clouds to Climbing Stairs: A Comparison of Plane Segmentation Approaches for Humanoids. In Humanoid Robots (Humanoids), 2011 11th IEEE-RAS International Conference on (pp. 93-98). IEEE.
Bostelman, R., Hong, T., & Chang, T. (Oct. 2006). Visualization of Pallets. In Optics East 2006 (pp. 638408-638408). International Society for Optics and Photonics.
Beinschob, P., & Reinke, C. (Sep. 2013). Strategies for 3D Data Acquisition and Mapping in Large-Scale Modern Warehouses. In Intelligent Computer Communication and Processing (ICCP), 2013 IEEE International Conference on (pp. 229-234). IEEE.

(Continued)

*Primary Examiner* — Matthew Bella
*Assistant Examiner* — Brian Shin
(74) *Attorney, Agent, or Firm* — Middleton Reutlinger (57) ABSTRACT

Methods, apparatus, and computer readable storage media related to defining a planar model that approximates a plurality of surfaces of an object and/or applying the planar model to detect the object and/or to estimate a pose for the object. For example, the planar model may be compared to data points sensed by the a three-dimensional vision sensor of a robot to determine the object is present in the field of view of the sensor and/or to determine a pose for the object relative to the robot. A planar model comprises a plurality of planar shapes modeled relative to one another in a three-dimensional space and approximates an object by approximating one or more surfaces of the object with the planar shapes.

21 Claims, 6 Drawing Sheets

(56) References Cited

OTHER PUBLICATIONS

Rusu, R. B., Blodow, N., & Beetz, M. (May 2009). Fast Point Feature Histograms (FPFH) for 3D Registration. In Robotics and Automation, 2009. ICRA'09. IEEE International Conference on (pp. 3212-3217). IEEE.

Drost, B., Ulrich, M., Navab, N., & Ilic, S. (Jun. 2010). Model Globally, Match Locally: Efficient and Robust 3D Object Recognition. In Computer Vision and Pattern Recognition (CVPR), 2010 IEEE Conference on (pp. 998-1005). IEEE.

Hinterstoisser, S., et al. (Nov. 2011). Multimodal Templates for Real-Time Detection of Texture-Less Objects in Heavily Cluttered Scenes. In Computer Vision (ICCV), 2011 IEEE International Conference on (pp. 858-865).

* cited by examiner

DEFINING AND/OR APPLYING A PLANAR MODEL FOR OBJECT DETECTION AND/OR POSE ESTIMATION

BACKGROUND

In performing various robotic tasks, it may be beneficial and/or necessary for robots to detect environmental objects and estimate poses (positions and/or orientations) for those detected objects. For example, an automated pallet jack robot needs to know where a pallet is before picking it up, a robotic arm needs to know where a table top is before placing a bottle on it, and a humanoid robot needs to know how a staircase locates before stepping on it.

Various techniques have been utilized for detecting objects and estimating their poses. For example, a robot may have access to a complete three-dimensional ("3D") model of an object that was acquired using a 3D scanner to scan the object from all different angles and combining all the scans together to compute the complete 3D model. The robot may acquire data from a 3D laser scanner or other 3D vision sensor viewing a portion of the robot's environment, and map such data to the complete 3D model to determine the object is present and to estimate the object's pose. However, such a technique requires acquiring a complete 3D model of an object by scanning the object from all different angles and combining the scans together to compute the complete 3D model. This may be a time consuming step. Moreover, scanners required to perform this step may have constraints that make scanning impracticable for some larger objects such as some pallets, shelves, and/or stairs. Additional and/or alternative drawbacks of the aforementioned techniques and/or other techniques may be presented.

SUMMARY

The present disclosure is generally directed to defining a "planar model" that approximates a plurality of surfaces of an object and/or applying the planar model to detect the object and/or to estimate a pose for the object. For example, the planar model may be compared to data points sensed by the a three-dimensional vision sensor of a robot to determine the object is present in the field of view of the sensor and/or to determine a pose for the object relative to the robot. A planar model defines a plurality of planar shapes modeled relative to one another in a three-dimensional space and approximates an object by approximating one or more surfaces of the object with the planar shapes. For example, stairs can be approximated in a planar model by a set of connected vertical and horizontal rectangular planes; a pallet can be approximated in a planar model by a group of rectangular planes that define all or aspects of one or more visible surfaces of the pallet; and/or a shelf can be approximated in a planar model by a set of connected vertical and horizontal rectangular planes. As used herein, a "pose" of an object may reference a position of the object only (e.g., a three-dimensional coordinate), or may reference both the position of the object and an orientation of the object.

In some implementations, the surfaces that are modeled by a planar model are all modeled by planar shapes. In other words, the surfaces defined by the planar model are defined only by the planar shapes. In some implementations, a planar model is not computed from any three-dimensional scan data. For example, the planar model is not generated by one or more processors applying one or more methods to three-dimensional scan data to generate the planar model. In some of those implementations, the planar model may be generated based, entirely or in part, on human input. For example, a human may utilize one or more user input devices of a computing device to draw or otherwise indicate a plurality of planar shapes and their positional relationships to be defined in the planar model. In some implementations, a total quantity of planar shapes that are included in the model may be within a range such as a range from 2-20, 3-15, or 4-10. In some implementations, a planar model approximates less than all of the visible surfaces of an object, such as less than 90%, 80%, 70%, 60%, or 50% of the visible surfaces of the object.

A defined planar model can be applied to data points (e.g., a point cloud or depth image) sensed by a three-dimensional vision sensor of a robot (e.g., a 3D laser scanner or stereo camera) to detect the object modeled by the planar model and/or to determine the object pose for that object relative to the robot. For example, for each of a plurality of the data points: the planar model's origin may be translated to the data point, the model may be rotated in a plurality of different directions for that translation, each rotation of the model may be projected to the data points, and the difference between the values defined by the planar model and the data points may be calculated at each of the rotations. Accordingly, differences are calculated for each of a plurality of projections of the model to the data points, where each projection is unique (e.g., each projection is a unique "translation of the model to a data point", "rotation of the model" pair). The projection with the minimal differences (satisfies a threshold relative to the differences of other projections) and/or with differences that otherwise satisfy a threshold (e.g., the differences satisfy some "satisfactory minimum" threshold) may be used to determine: 1) that the object is present and/or 2) the pose of the object. The pose of the object may be determined based on the pose of the planar model at that projection (e.g., since that projection satisfies the threshold, it is "closest" to the object in the real world and the pose can be estimated based on the pose of the planar model at that projection).

In some implementations, a method is provided that includes: receiving, from a three-dimensional vision sensor of a robot, a group of data points sensed by the three-dimensional vision sensor; and retrieving, by one or more processors, a three-dimensional planar model that approximates a plurality of surfaces of an object. The planar model defines a plurality of planar shapes modeled relative to one another in a three-dimensional space. The method further includes: calculating, by one or more of the processors and for each of a plurality of projections of the model to the data points, differences between the planar model and the data points for a corresponding projection of the projections; determining, by one or more of the processors, that a projection of the projections satisfies a threshold based on the differences between the planar model and the data points for the projection; and determining, by one or more of the processors, an object pose for the object relative to the robot based on a planar model pose of the planar model at the projection that satisfies the threshold.

This method and other implementations of technology disclosed herein may each optionally include one or more of the following features.

In some implementations, the method further includes adjusting the robot based on the determined object pose. In some of those implementations, the planar model further defines an action area relative to one or more of the planar shapes and adjusting the robot is further based on the action area defined by the planar model. For example, the object may be a pallet, the robot may include forks coupled to an elevator, and adjusting the robot may include adjusting a robot pose of the robot to position the forks to encounter the action area.

In some implementations, the object is a pallet that includes a plurality of stringers, a first planar shape of the planar model approximates a first stringer surface of a first stringer end of a first stringer of the stringers, and a second planar shape of the planar model approximates a second stringer surface of a second stringer end of a second stringer of the stringers. The first stringer end and the second stringer end may both be on a same side of the pallet. In some of those implementations, the planar model does not approximate any surfaces of the first stringer and the second stringer that are in addition to the first stringer surface and the second stringer surface. In some implementations, the pallet further includes a plurality of deckboards coupled to the stringers and a third planar shape of the planar model approximates a deckboard of the deckboards. The deckboard may be more proximal to the first stringer end and the second stringer end than any other of the deckboards are to the first stringer end and the second stringer end. In some of those implementations, the planar model does not approximate any surface of at least one of the deckboards.

In some implementations, a majority of the surfaces modeled by the planar model are modeled by the planar shapes. In some of those implementations, a total quantity of the planar shapes defined by the model is less than fifteen.

In some implementations, all of the surfaces modeled by the planar model are modeled by the planar shapes.

In some implementations, the planar model is not computed from any three-dimensional scan data.

In some implementations, the planar model is generated based on human input provided via one or more user interface input devices.

In some implementations, the planar shapes are all polygons. In some of those implementations, the polygons are all four-sided.

In some implementations, the method further includes: translating an origin point of the planar model to a data point of the group of data points; and generating each projection of a group of the projections based on a different rotation of the planar model when the origin point of the planar model is translated to the data point.

Other implementations may include one or more non-transitory computer readable storage medium storing one or more planar models and/or storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
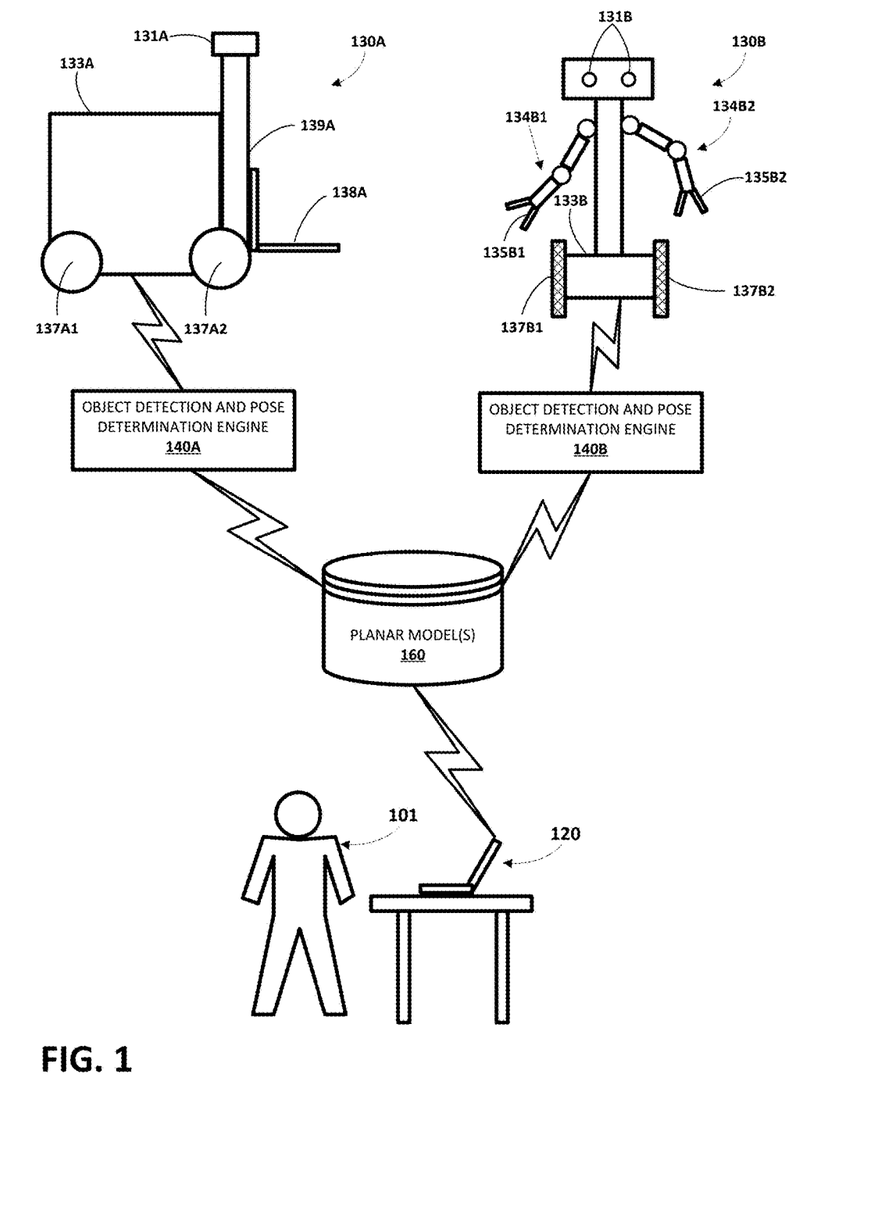
FIG. 1 illustrates an example environment in which a planar model that approximates an object may be defined and/or in which the planar model may be applied to detect the object and/or to estimate a pose for the object.

FIG. 1 illustrates an example environment in which a planar model that approximates an object may be defined and/or in which the planar model may be applied to detect the object and/or to estimate a pose for the object. The environment includes robot 130A that includes and/or is in network communication with object detection and pose determination engine 140A and robot 130B that includes and/or is in network communication with object detection and pose determination engine 140B.

Also provided in the environment of FIG. 1 is a human 101, a computing device 120 that may be used by the human 101, and planar models database 160. Planar models database 160 includes one or more planar models that each approximate a plurality of surfaces of a corresponding object with a plurality of planar shapes (e.g., planar quadrilaterals) modeled relative to one another in a three-dimensional space.

In some implementations, one or more (e.g., all) of the planar models of database 160 may be stored in one or more non-transitory computer readable storage media of the robot 130A and/or of the robot 130B. In some implementations, one or more (e.g., all) of the planar models of database 160 may be stored in one or more non-transitory computer readable storage media that are separate from the robot 130A and/or robot 130B, and the robot 130A and/or robot 130B may access those planar models via a direct connection to the one or more media and/or via one or more networks such as a local area network and/or a wide area network (e.g., the Internet). In some implementations, one or more of the planar models of database 160 may be defined by users via one or more computing devices, such as by the human 101 utilizing the computing device 120. In FIG. 1 the computing device 120 is a laptop computer. However, additional and/or alternative computing devices may be utilized such as desktop computing device, a tablet computing device, a mobile phone computing device, etc.

Figure 2A:
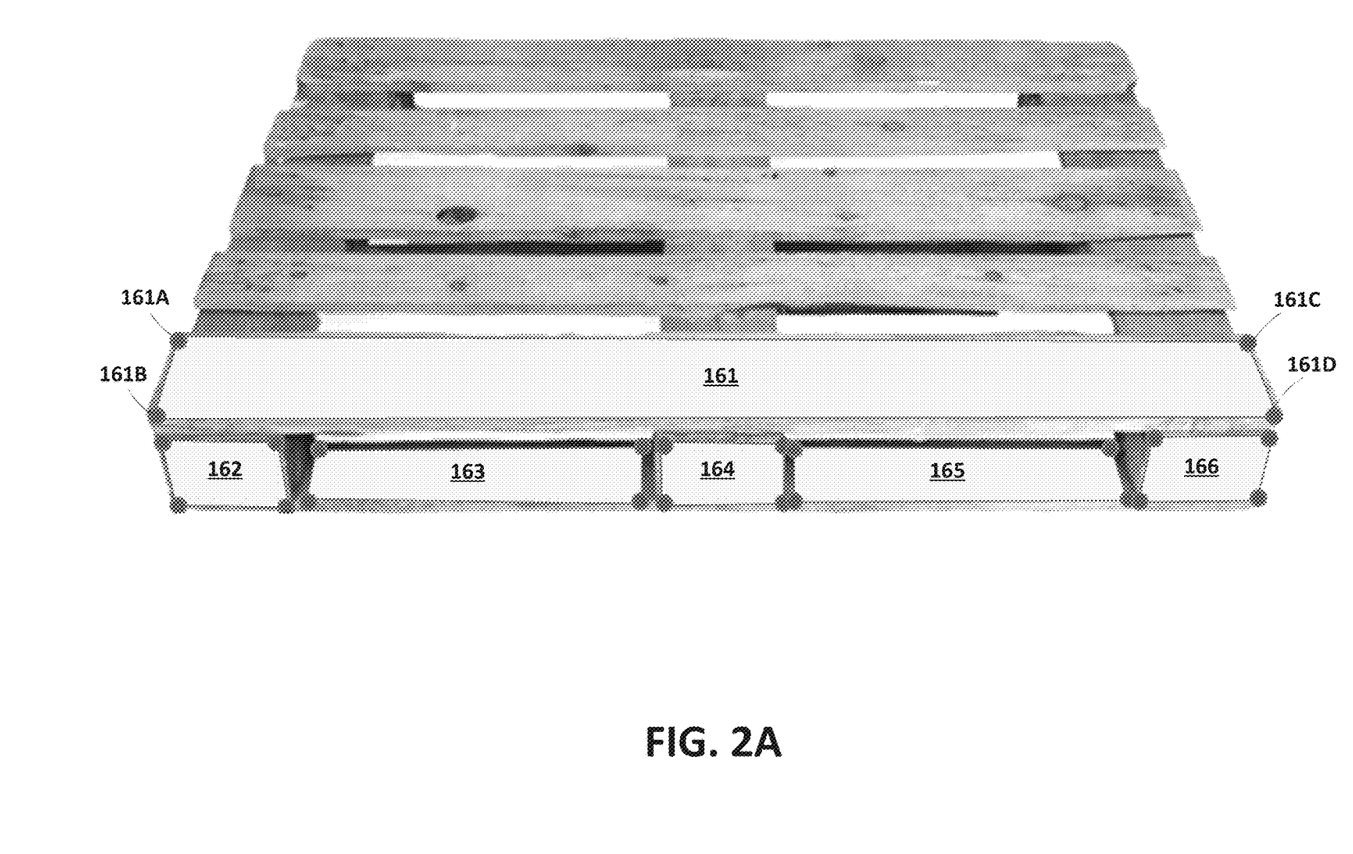
FIG. 2A illustrates an example pallet and illustrates a representation of an example planar model that approximates the pallet.

One example of a planar model that may be defined in database 160 is represented in FIG. 2A. FIG. 2A illustrates an example pallet 105 and six rectangular planes 161-166 that represent a planar model that approximates the pallet 105. The six rectangular planes 161-166 capture the main structure around two of the fork holes of the pallet 105 and, as described below, can be utilized by a robot to determine presence of a pallet in the robot's environment and/or to determine the pose of a pallet in the robot's environment.

Determining the pose of a pallet may enable the robot to, inter alia, appropriately position forks of the robot in fork holes of the pallet for lifting and/or moving of the pallet.

The rectangular plane 162 has a size, position, and orientation that approximates the surface of one end of a first stringer board of the pallet 105. The rectangular plane 164 has a size, position, and orientation that approximates the surface of one end of a second stringer board of the pallet 105. The rectangular plane 166 has a size, position, and orientation that approximates the surface of one end of a third stringer board of the pallet 105. The rectangular planes 162, 164, and 166 may approximate the surfaces of the ends of corresponding stringer boards of the pallet 105 since, for example, they are planar and do not capture texture that may be provided on the corresponding surfaces, their sizes may not strictly conform to the corresponding surfaces, and/or their orientations may not fully conform to various orientations that may be present on the corresponding surfaces.

The rectangular plane 161 has a size, position, and orientation that approximates an outward facing surface of a deckboard of the pallet 105 that is most proximal to the ends of the three stringer boards approximated by rectangular planes 162, 164, and 166. The rectangular plane 161 may approximate the surface of the deckboard of the pallet 105 since, for example, it is planar and does not capture texture that may be provided on the surface, its size may not strictly conform to the surface, and/or its orientation may not fully conform to various orientations that may be present on the surface.

The rectangular plane 163 has a size, position, and orientation that approximates a first portion of an exposed inward facing surface of a support board of the pallet 105 that is coupled to the stringer boards of the pallet 105 opposite of the deckboard approximated by rectangular plane 161. The rectangular plane 163 has a size, position, and orientation that approximates a second portion of the exposed inward facing surface of the support board of the pallet 105 that is coupled to the stringer boards of the pallet 105 opposite of the deckboard approximated by rectangular plane 161. The rectangular planes 163 and 165 may approximate the corresponding portions of the exposed inward facing surface of the support board of the pallet 105, for example, they are planar and do not capture texture that may be provided on the corresponding portions, their sizes may not strictly conform to the corresponding portions, and/or their orientations may not fully conform to various orientations that may be present on the corresponding portions.

In some implementation, the rectangular planes 162, 164, and 166 are coplanar and/or the rectangular planes 163 and 165 are coplanar. In some implementations, rectangular planes 163 and 165 are parallel with rectangular plane 161. In some implementations, rectangular planes 161, 163, and/or 165 are orthogonal to rectangular planes 162, 164, and/or 166.

Figure 2B:
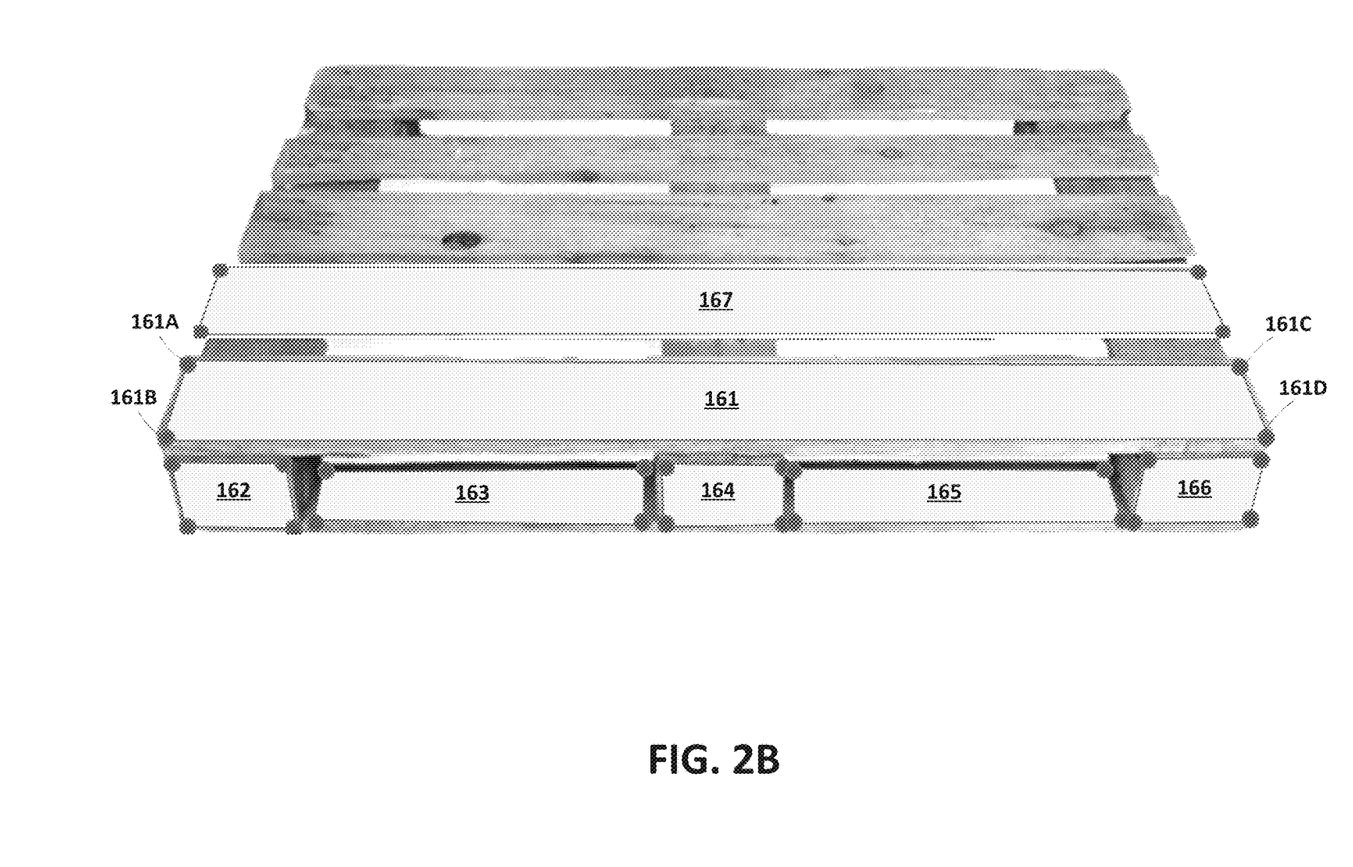
FIG. 2B illustrates the example pallet of FIG. 2A and illustrates a representation of another example planar model that approximates the pallet.

Another example of a planar model that may be defined in database 160 is represented in FIG. 2B. FIG. 2B illustrates the example pallet 105 of FIG. 2A and seven rectangular planes 161-167 that represent a planar model that approximates the pallet 105. The seven rectangular planes 161-167 include the rectangular planes 161-166 described above with respect to FIG. 2A. An additional rectangular plane 167 is also included that has a size, position, and orientation that approximates an outward facing surface of an additional deckboard of the pallet 105 that is most proximal to the deckboard approximated by rectangular plane 161.

Although specific planar models are represented in FIGS. 2A and 2B, the planar model for the pallet 105 may vary in one or more respects in other implementations. For example, more or fewer rectangular planes could be defined, different size rectangular planes could be defined, etc. Moreover, planar models for the pallet and/or other objects may include additional and/or alternative planar shapes, such as other planar polygonal shapes (e.g., other planar quadrilaterals). Moreover, while FIGS. 2A and 2B represent a model for a pallet, planar models may be provided that approximate additional and/or alternative objects such as, for example, stairs, shelves, and boxes.

It is noted that the planar models represented by FIGS. 2A and 2B may be utilized to detect other pallets that differ from the pallet 105, such as pallets that have a continuous deck (e.g., a single piece of wood, metal, plastic, or other material), pallets that have different surface textures, pallets that have a different quantity of deckboards, and/or pallets that have different sized deckboards, stringers, and/or support boards. In some implementations, other planar models may be defined for other pallets. It is also noted that in some implementations the planar models represented by FIGS. 2A and 2B may be utilized to detect a pallet and/or pose for the pallet from vantage points that differ from that illustrated in FIGS. 2A and 2B. For example, the pallet 105 may be a so-called "two-way pallet" or "four-way pallet" and the planar models represented in FIGS. 2A and 2B may be utilized to detect the pallet and/or pose based on data points that capture either of two opposed sides of the pallet 105.

In some implementations, a planar shape may be defined in a planar model as a group of position coordinates that define the planar shape. For example, as illustrated in FIGS. 2A and 2B, the rectangular plane 161 may be defined as four position coordinates represented by indications 161A, 161B, 161C, and 161D that define the four corners of the rectangular plane 161.

In some implementations, a planar model may further define an object identifier that identifies a category and/or other class identifier of the object and/or that otherwise identifies the object. In some of those implementations, the object identifier can be used by a robot to determine how to interact with an object that is detected based on the model. For example, the model represented in FIGS. 2A and/or 2B may further define that it is a model of a "pallet" and a robot may utilize such definition to identify one or more actions that can be performed by the robot on a pallet. As another example, a first planar model may approximate a pallet and define an object identifier for the pallet and a second planar model may approximate shelving and define an object identifier for the shelving. A robot may apply both planar models to a group of sensed data points and determine the data points satisfy a threshold for the first planar model but not for the second planar model. The robot may further determine the first model is for a pallet based on the object identifier and perform one or more actions that are particularized to pallets based on the object identifier being defined in the first planar model that satisfied the threshold.

In some implementations where the planar model defines an object identifier, the robot may determine an object in the robot's environment is associated with that object identifier based on an environmental identifier of the object in the environment that is sensed using one or more sensor of the robot. For example, the robot may use a camera to sense a fiducial marking on the object in the environment and determine the object identifier based on the fiducial marking or may use a radio-frequency identification reader to sense an RFID tag of the object in the environment and determine the object identifier based on the RFID tag. The robot may then utilize the object identifier to identify a planar model that defines that object identifier and use the planar model to detect the pose of the object in the robot's environment.

In some implementations, a planar model may further define one or more action areas in the model that can be utilized by a robot as a cue for performing actions on an object detected based on the model. For example, in some implementations the planar model of FIGS. 2A and/or 2B may further define an action area in the planar model for the two fork holes of the pallet 105 that are at the "front" of the pallet in FIGS. 2A and 2B (the fork hole between the first and second stringers with surfaces approximated by 162 and 164 and the fork hole between the second and third stringers with surfaces approximated by 164 and 166). For example, the action areas may each be defined as one or more position coordinates in the planar model, such as position coordinates that define a planar shape. For instance, a first action area may be defined as a rectangular plane that is coplanar with rectangular planes 162 and 164, that is between and doesn't overlap with rectangular planes 162 and 164, and that does not intersect the plane in which rectangular plane 161 lies or the plane in which rectangular plane 163 lies. The robot may utilize the defined action areas as a cue for positioning its forks.

In some implementations, the surfaces modeled by a planar model are all modeled by planar shapes. In other words, the surfaces defined by the planar model are defined only by the planar shapes. In some implementations, a majority of the surfaces modeled by the planar model are modeled by planar shapes. For example, in some implementations at least 75% of the surfaces modeled by the planar model are modeled by planar shapes. Also, for example, in some implementations at least 90%, 95%, or 99% of the surfaces modeled by the planar model are modeled by planar shapes. In some implementations, a total quantity of planar shapes that are included in the model may be within a range such as a range from 2-20, 3-15, or 4-10. In some implementations, a planar model approximates less than all of the visible surfaces of an object, such as less than 90%, 80%, 70%, 60%, or 50% of the visible surfaces of the object. In some implementations, visible surfaces of an object may define those surfaces of the object that would be visible by a 3D vision device if the object was presented to the 3D vision device at all possible rotations of the object. In some implementations, visible surface of an object may define those surfaces of the object that would be visible by a 3D vision device if the 3D vision device was presented at all angles relative to the object while the object was placed on a platform (i.e., in those implementations visible surface of the object would exclude those surfaces of the object blocked by the platform that could not be viewed by the 3D vision device). As one example, the planar models represented in FIGS. 2A and 2B model less than 30% of the visible surfaces of pallet 105 under either definition of visible surfaces.

In some implementations, a planar model is not computed from any three-dimensional scan data. In other words, in some implementations the planar model is not generated by one or more processors applying one or more methods to three-dimensional scan data to generate the planar model. For example, the planar model is not computed by scanning the object from all different angles and applying one or more methods to sensor data from the scanning to generate the planar model. In some of those implementations, the planar model may be generated based, entirely or in part, on human input. For example, the human 101 may utilize one or more user interface input devices of computing device 120 to draw or otherwise indicate a plurality of planar shapes and their three-dimensional positional relationships that will define a planar model. For example, the computing device 120 may display a graphical user interface and the human 101 may utilize one or more user interface input devices and feedback from the graphical user interface to draw a plurality of planar shapes, to indicate positional coordinates that define a plurality of shapes (e.g., four positional coordinates to define a quadrilateral), or otherwise indicate a plurality of planar shapes and their positional relationships that will define the planar model. In some implementations, the human 101 may use a computer-aided drafting (CAD) application of the computing device 120 to define the planar model. In some of those implementations, an image or other representation of the planar model may optionally be displayed in the CAD application to facilitate defining of the planar model.

Some implementations of a planar model for an object described herein may enable more efficient utilization of one or more hardware resources (e.g., one or more processors and/or memory or other storage resource) than a complete three-dimensional ("3D") model of the object that was acquired using a 3D scanner to scan the object from all different angles and combining all the scans together to compute the complete 3D model. For example, some implementations of a planar model may be stored using less bytes of data, such as implementations where the planar model approximates less than all of the visible surfaces of an object and/or implementations where one or more planar shapes of the planar model are defined as a group of position coordinates that define the planar shape. Also, for example, some implementations of a planar model may be defined utilizing less hardware resources than what is necessary to scan an object from all different angles and combine all the scans together. Also, for example, application of some implementations of a planar model to data points from a 3D vision sensor may utilize less hardware resources than application of a complete 3D model, such as implementations where the planar model approximates less than all of the visible surfaces of an object (e.g., since the non-approximated surfaces will not be applied). Additional and/or alternative efficiencies may be present in some implementations, such as, but not limited to, one or more of those discussed separately herein.

Referring again to FIG. 1, the robot 130A is a pallet jack robot that includes a plurality of forks 138A coupled to an elevator 139A. The elevator 139A raises and lowers the forks 138A to enable pallets and/or other objects to be lifted off of the ground and repositioned. The robot 130A also includes a base 133A with four wheels (wheels 137A1 and 137A2 are illustrated) provided thereon for locomotion of the robot 130A. The base 133A may include, for example, one or more motors for driving corresponding wheels to achieve a desired direction, velocity, and/or acceleration of movement for the robot 130A.

The robot 130A also includes various sensors such as three-dimensional vision sensor 131A, which is a 3D laser scanner in the illustrated embodiment. A 3D laser scanner includes one or more lasers that emit light and one or more sensors that collect data related to reflections of the emitted light. A 3D laser scanner may be, for example, a time-of-flight 3D laser scanner or a triangulation based 3D laser scanner and may include a position sensitive detector (PSD) or other optical position sensor. The object detection and pose determination engine 140A of the robot 130A applies one or more planar models of database 160 to data points sensed by the three-dimensional vision sensor 131A to detect an object modeled by one of the planar models and/or to determine the object pose for that object relative to the robot 130A. Additional description of engine 140A is provided herein. One or more (e.g., all) aspects of the engine 140A may be implemented in hardware of the robot 130A in some implementations. In some implementations, one or more (e.g., all) aspects of the engine 140A may be implemented in hardware separate from the robot 130A. In some of those implementations, the robot 130A may provide data to, and/or receive data from, the engine 140A via one or more networks. In other implementations a direct connection between one or more components may be utilized.

In some implementations, the wheels of the robot 130A may be controlled autonomously and/or semi-autonomously and/or the elevator 139A may be controlled autonomously and/or semi-autonomously. For example, the robot 130A may position itself autonomously based on an object pose determined based on a planar model as described herein. For instance, the robot 130A may lift and reposition pallets and the object detection and pose determination engine 140A of the robot 130A may determine the pose of a pallet near the robot 130A according to techniques described herein, and the robot 130A may drive the wheels thereof autonomously and/or adjust the height of the forks 138A autonomously based on the determined pose to enable the robot 130A to position the forks 138A in fork holes of the pallet.

The robot 130A also includes one or more processors that, for example: provide control commands to actuators (e.g., servo motors) and/or other operational components of the robot 130A; implement one or more aspects of object detection and pose determination engine 140A; and/or determine control commands to adjust one or more operational components of the robot 130A based on a pose for an object determined by engine 140A. Additional description of some examples of the structure and functionality of the processor and other components of robot 130A is provided herein.

The robot 130B includes robot arms 134B1 and 134B2 with corresponding end effectors 135B1 and 135B2, that each take the form of a gripper with two opposing "fingers" or "digits." The robot 130B also includes a base 133B with wheels 137B1 and 137B2 provided on opposed sides thereof for locomotion of the robot 130B. The base 133B may include, for example, one or more motors for driving corresponding wheels 137B1 and 137B2 to achieve a desired direction, velocity, and/or acceleration of movement for the robot 130B.

The robot 130B also includes various sensors such as three-dimensional vision sensor 131B which, is a stereo camera in the illustrated embodiment. A stereo camera includes two or more sensors (e.g., charge-coupled devices (CCDs)), each at a different vantage point and generates, based on the data sensed by the two sensors, a depth image that includes a plurality of data points defining depth values. The object detection and pose determination engine 140B of the robot 130B applies one or more planar models of database 160 to data points sensed by the three-dimensional vision sensor 131B to detect an object modeled by one of the planar models and to determine the object pose for that object relative to the robot 130B. Additional description of engine 140B is provided herein. One or more (e.g., all) aspects of the engine 140B may be implemented in hardware of the robot 130B in some implementations. In some implementations, one or more (e.g., all) aspects of the engine 140B may be implemented in hardware separate from the robot 130B. In some of those implementations, the robot 130B may provide data to, and/or receive data from, the engine 140B via one or more networks. In other implementations a direct connection between one or more components may be utilized.

In some implementations, the wheels 137B1, 137B2 of the robot 130B may be controlled autonomously and/or semi-autonomously and/or the robot arms 134B1, 134B2 and end effectors 135B1, 135B2 may be controlled autonomously and/or semi-autonomously. For example, the robot 130B may position itself autonomously based on an object pose determined based on a planar model as described herein. Also, for example, robot 130B may autonomously control robot arms 134B1, 134B2 and/or end effectors 135B1, 135B2 based on a planar model as described herein. For instance, the robot 130B may pick up and deliver objects to pallets, the object detection and pose determination engine 140B of the robot 130B may determine the pose of a pallet near the robot 130B according to techniques described herein, and the robot 130B may drive the wheels 137B1 and 137B2 and the arms 134B1 and 134B2 autonomously based on the determined pose to enable the robot 130B to place an object on the pallet.

The robot 130B also includes one or more processors that, for example: provide control commands to actuators and/or other operational components of the robot 130B; implement one or more aspects of object detection and pose determination engine 140B; and/or determine control commands to adjust one or more operational components of the robot 130B based on a pose for an object determined by engine 140B. Additional description of some examples of the structure and functionality of the processor and other components of robot 130B is provided herein.

In some implementations, additional and/or alternative robots may be provided in the environment, such as additional robots that vary in one or more respects from robots 130A and 130B illustrated in FIG. 1. In some of those implementations, each of one or more of the robots may embody all or aspects of an object detection and pose determination engine and/or communicate with all or aspects of such an engine that is separate from the robot. Moreover, in some of those implementations, each of one or more of the robots may have access to, or may embody, one or more planar models of database 160.

The object detection and pose determination engines 140A and 140B each apply one or more planar models to data points (e.g., a point cloud or depth image) sensed by corresponding sensor 131A or 131B to determine whether an object modeled by one of the planar models is present and/or to determine the object pose for that object relative to the corresponding robot 130A or 130B. The engines 140A and 140B may, for each of a plurality of the data points: translate the planar model's origin to the data point, rotate the model in all possible directions for that translation, project the model to the data points for each rotation of the model, and calculate the difference (e.g., the Euclidian distance) between the values defined by the planar model and the data points at each of the rotations. Accordingly, the engines 140A and 140B calculate differences for each of a plurality of projections of the model to the data points, where each projection is unique (e.g., each projection is a unique "translation of the model to a data point", "rotation of the model" pair). The engines 140A and 140B may select the projection with the minimal differences (satisfies a threshold relative to the differences of other projections) and/or with differences that otherwise satisfy a threshold (e.g., the differences satisfy some "satisfactory minimum" threshold) and use the selected projection to determine: 1) that the object is present and/or 2) the pose of the object. The pose of the object may be determined based on the pose of the planar model at the selected projection. Since that projection satisfies the threshold, it is "closest" to the object in the real world and the pose can be estimated based on the pose of the planar model at the selected projection. For example, the determined pose may be the same as the pose of the planar model at the selected projection.

Stated differently, for each of a plurality of projections of a planar model to the data points, the engine 140A or 140B may calculate differences between the planar model and the data points for a corresponding projection; the engine 140A or 140B may determine a projection of the projections satisfies a threshold that is based on the differences between the planar model and the data points for that projection; and the engine 140A or 140B may determine the object is present based on that projection satisfying the threshold and/or may determine the pose of the object based on the pose of the projection. In some implementations, generating each projection of each of a plurality of groups of the projections may include: translating an origin point of the planar model to a corresponding data point of the group of data points; and generating each projection of the group based on a different rotation of the planar model when the origin point of the planar model is translated to the data point.

Figure 3:
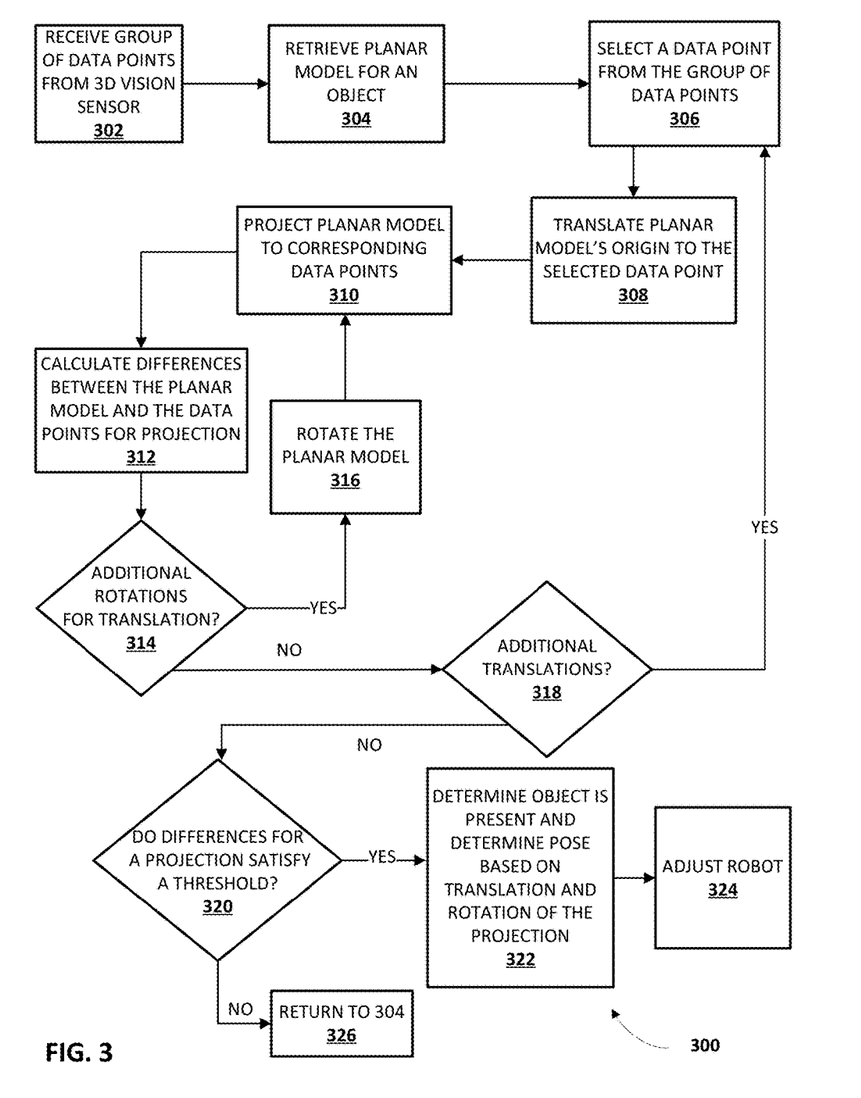
FIG. 3 depicts a flow chart illustrating an example method of applying a planar model to data points sensed by a three-dimensional vision sensor of a robot to detect the object and determine a pose for the object relative to the robot.

In some implementations, pose determination engines 140A and 140B may each perform one or more (e.g., all) aspects of the example method 300 of FIG. 3. FIG. 3 depicts a flow chart illustrating an example method 300 of applying a planar model to data points sensed by a three-dimensional vision sensor of a robot to detect an object and determine a pose for the object relative to the robot. For convenience, the operations of the flow chart are described with reference to a system that performs the operations. This system may include various components of various systems, such as object detection and pose determination engine 140A, object detection and pose determination engine 140B, and/or controller 602 (FIG. 6). Moreover, while operations of method 300 are shown in a particular order, this is not meant to be limiting. One or more operations may be reordered, omitted or added.

At block 302, the system receives a group of data points from a three-dimensional vision sensor of a robot. For example, the system may receive a point cloud from a 3D laser scanner or a depth image from a stereo camera. At block 304, the system retrieves a planar model for an object. For example, the planar model may be the only planar model defined for the system or may be selected from a plurality of defined planar models (e.g., a random or pseudo-random selection, or a selection based on mapping an environmental identifier of an environmental object determined based on sensor data of the system to an object identifier defined for the planar model).

At block 306, the system selects a data point from the group of data points. The selection may be a random or pseudo-random selection, according to a selection order, and/or may be based on comparison of the data points to the planar model.

At block 308, the system translates the planar model's origin to the selected data point. As used herein, translating the planar model's origin to the selected data point may include keeping the planar model fixed and translating data points of the group to the planar model or keeping the group of data points fixed and translating the planar model to data points of the group.

At block 310, the system projects, for the translation of block 308, the planar model to corresponding data points of the group of data points. At block 312, the system calculates the differences between the planar model and the data points for the projection. For example, the system may calculate, for each of the data points of the projection, a Euclidian distance between the data point and a corresponding value of a corresponding planar shape defined in the planar model.

At block 314, the system determines whether differences are to be calculated for additional rotations for the translation. If the system determines at block 314 that differences are to be calculated for additional rotations for the translation, the system proceeds to block 316 and rotates the planar model for the translation. As used herein, rotating the planar model may include rotating the planar model only, rotating data points of the group only, and/or rotating both the planar model and data points of the group. In some implementations, the rotation of the planar model in block 316 may optionally be constrained to rotations in only a single plane for some planar models, such as planar models that approximate pallets or stairs. In some of those implementations, the planar model may define rotation constraints. For example, a human that defines a planar model may define rotation constraints for the planar model that may be adhered to in block 316. Implementations that adhere to rotation constraints for the model may reduce the amount of time needed for the system to perform the method 300 relative to implementations that do not adhere to rotation constraints.

After block 316, the system then projects the planar model to corresponding data points at block 310 for the new rotation of block 316 and then calculates the differences between the planar model and the data points for the projection at block 312. Blocks 316, 310, and 312 may be repeated a number of times for a given translation to calculate additional differences for each of a plurality of rotations of the given translation.

If the system determines at block 314 that differences are not to be calculated for additional rotations for the translation, the system proceeds to block 318 and determines whether additional differences are to be calculated for additional translations of the planar model. If the system determines at block 318 that differences are to be calculated for additional translations of the planar model, the system proceeds to block 306 and selects another data point from the group of data points. Blocks 308, 310, 312, 314, 316, and/or 318 are then performed one or more times for a new translation of the planar model to the newly selected data point to calculate additional differences for each of a plurality of rotations of the new translation.

If the system determines at block 318 that differences are not to be calculated for additional translations of the planar model, the system proceeds to block 320 and determines whether the differences for a projection of the projections satisfies a threshold. If not, the system returns to block 304 and retrieves an additional planar model and repeats blocks of the example method utilizing the additional planar model. If so, the system proceeds to block 322 and determines the object is present and determines a pose for the object relative to the robot based on the translation and the rotation of the projection that satisfied the threshold. For example, the pose of the planar model at the selected projection may be used as the object pose.

In some implementations, block 320 includes determining the calculated differences for the projection satisfies some "satisfactory minimum" threshold (e.g., a threshold that indicates the projection is a "sufficiently close" match to the corresponding data points) and that the calculated differences for the projection satisfy a threshold relative to the differences of the other projections (e.g., are less than the differences for any other projections). Comparing the calculated differences to a threshold may include determining a mean squared error of the differences or other value that is a function of the differences, and comparing that value to the threshold. In some implementations, block 320 may be performed as part of each block 314 and/or 318. In other words, in some implementations block 320 may be performed to interrupt determining differences for additional rotations and/or translations if differences for a given projection satisfy some threshold that indicates a "close match" of the projection to the corresponding data points.

At block 324, the system adjusts the robot based on determining the object is present and/or based on the determined pose of the object. For example, the system may provide one or more control commands to one or more actuators of the robot to position the robot and/or one or more operational components of the robot based on a determined object pose. For instance, a pallet jack robot may drive wheels thereof autonomously and/or adjust the height of forks thereof autonomously based on the determined pose to enable the robot to position the forks in fork holes of the pallet. As described herein, in some implementations the system may utilize one or more action areas defined in a planar model in adjusting the robot.

In some implementations, at block 324, the system additionally or alternatively may localize the robot based on the determined pose of the object. For example, if the absolute object pose is known (e.g., if a pose for the object relative to a reference-frame such as a so-called world frame is stored in a database or otherwise known), the system may determine the absolute pose of the robot based on the determined pose of the object relative to the robot and the absolute object pose. In other words, the system may determine the pose of the robot in a reference frame based on both the determined pose of the object relative to the robot and the absolute pose of the object in the reference frame.

Figure 4:
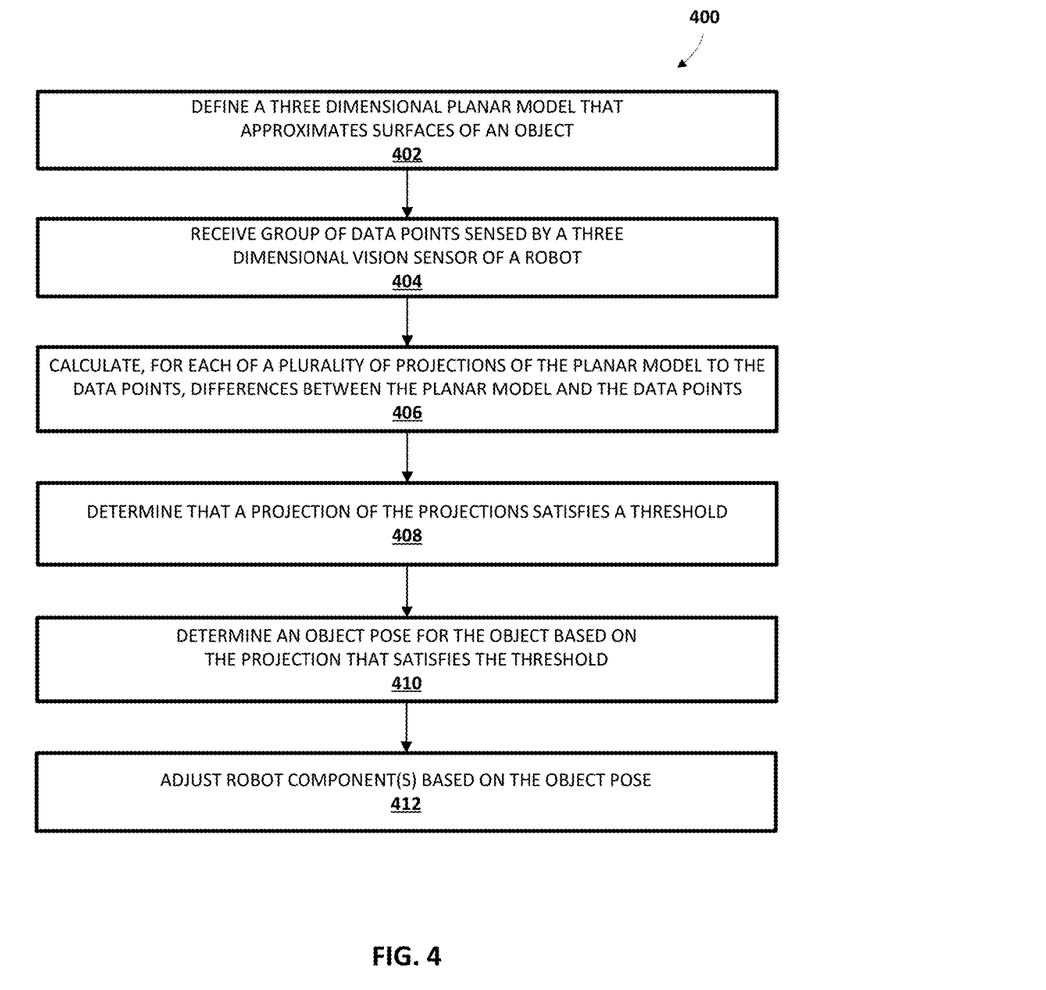
FIG. 4 depicts a flow chart illustrating an example method of defining a planar model that approximates an object and applying the planar model to detect the object and to estimate a pose for the object.

FIG. 4 depicts a flow chart illustrating an example method 400 of defining a planar model that approximates an object and applying the planar model to detect the object and to estimate a pose for the object. For convenience, the operations of the flow chart are described with reference to a system that performs the operations. This system may include various components of various computer systems, such as object detection and pose determination engine 140A, object detection and pose determination engine 140B, and/or controller 602 (FIG. 6). Moreover, while operations of method 400 are shown in a particular order, this is not meant to be limiting. One or more operations may be reordered, omitted or added.

At block 402, the system defines a three-dimensional planar model that approximates surfaces of an object. A planar model defines a plurality of planar shapes modeled relative to one another in a three-dimensional space and approximates an object by approximating one or more surfaces of the object with the planar shapes. In some implementations, the planar model is not computed from any three-dimensional scan data. In some of those implementations, the system defines the three-dimensional model based, entirely or in part, on human input. For example, a human may utilize one or more user interface input devices of a computing device to draw or otherwise indicate a plurality of planar shapes and their three-dimensional positional relationships that will define a planar model. In some implementations, the surfaces that are modeled by a planar model are all modeled by planar shapes. In other words, the surfaces defined by the planar model are defined only by the planar shapes.

At block 404, the system receives a group of data points sensed by a three-dimensional vision sensor of a robot. For example, the system may receive a point cloud from a 3D laser scanner or a depth image from a stereo camera. In some implementations, block 404 may share one or more aspects in common with block 302 of method 300.

At block 406, the system calculates, for each of a plurality of projections of the planar model to the data points, differences between the planar model and the data points. In some implementations, the system may generate each projection of each of a plurality of groups of the projections based on: translating an origin point of the planar model to a corresponding data point of the group of data points; and generating each projection of the group based on a different rotation of the planar model when the origin point of the planar model is translated to the data point. In some implementations, block 406 may share one or more aspects in common with blocks 306, 308, 310, 312, 314, 316, and/or 318 of method 300.

At block 408, the system determines that a projection of the projections satisfies a threshold. In some implementations, the system may determine that the that calculated differences for the projection satisfy some "satisfactory minimum" threshold (e.g., a threshold that indicates the projection is a "sufficiently close" match to the corresponding data points) and that the calculated differences for the projection satisfy a threshold relative to the differences of the other projections (e.g., are less than the differences for any other projections). In some implementations, block 408 may share one or more aspects in common with block 320 of method 300.

At block 410, the system determines an object pose for the object based on the projection that satisfies the threshold. For example, the system may use the pose of the planar model at the selected projection as the object pose. In some implementations, block 410 may share one or more aspects in common with block 322 of method 300.

At block 412, the system adjusts one or more robot components based on the object pose. For example, the system may provide one or more control commands to one or more actuators of the robot to adjust the pose of the robot and/or to adjust one or more operational components of the robot based on a determined object pose. In some implementations, at block 412, the system additionally or alternatively may localize the robot based on the determined pose of the object. In some implementations, block 410 may share one or more aspects in common with block 324 of method 300.

Figure 5:
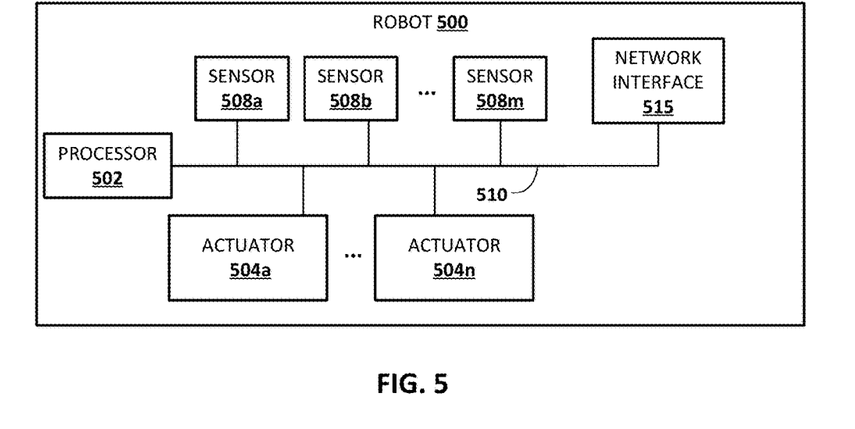
FIG. 5 schematically depicts an example architecture of a robot.

FIG. 5 schematically depicts an example architecture of a robot. Robot 500 may take various forms, including but not limited to a form similar to robot 330A, robot 330B, a telepresence robot, a humanoid form, an animal form, a wheeled device, a submersible vehicle, an unmanned aerial vehicle ("UAV"), and so forth. Robot 500 includes a processor 502. Processor 502 may take various forms, such as a central processing unit ("CPU"), a graphics processing unit ("GPU"), one or more field-programmable gate arrays ("FPGA"), one or more application-specific integrated circuits ("ASIC"), one or more so-called "real time controllers," and so forth.

In various implementations, processor 502 may be operably coupled with one or more actuators 504a-n and/or one or more sensors 508a-m, e.g., via one or more buses 510. Sensors 508a-m may take various forms, including but not limited to three-dimensional vision devices, two-dimensional vision devices, light sensors, pressure sensors, pressure wave sensors (e.g., microphones), motion sensors, proximity sensors, accelerometers, gyroscopes, thermometers, barometers, and so forth. While sensors 508a-m are depicted as being integral with robot 500, this is not meant to be limiting. In some implementations, one or more sensors 508a-m may be located external to robot 500, e.g., as standalone units.

Processor 502 may provide control commands to the actuators 504a-n and/or the sensors 508a-m to accomplish one or more tasks such as grasping objects, lifting pallets, moving pallets, placing pallets, climbing stairs (e.g., when the robot 500 is a humanoid robot), etc. Actuators 504a-n may include, for example, one or more end effectors and/or one or more servo motors or other actuators to effectuate movement of one or more components of the robot. For example, the robot 500 may have multiple degrees of freedom and each of the actuators 504a-n may control actuation of the robot 500 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The processor 502 may provide real time bursts of data to the actuators 504 a-n, with each of the real time bursts comprising a set of one or more control commands that dictate, inter alio, the parameters of motion (if any) for each of one or more of the actuators 504a-n. In some implementations, control commands may be generated by processor 502 to adjust the position of one or more operational components of the robot 500 based on an object pose determined based on a planar model according to techniques described herein.

Processor 502 may further execute instructions to implement one or more (e.g., all) aspects of object detection and pose determination engine 140A or 140B and/or may establish a network connection with engine 140A or 140B via network interface subsystem 515 (when engine 140A or 140B is separate from robot 500) and provide various data to and/or receive various data from engine 140A or 140B as described herein. Network interface subsystem 515 provides an interface to outside networks and is coupled to one or more corresponding interface devices in one or more other computer systems such as engine 140A or 140B. In some implementations, robot 500 may incorporate, in addition to other components, one or more aspects of a computer system, such as computer system 610 described below.

Figure 6:
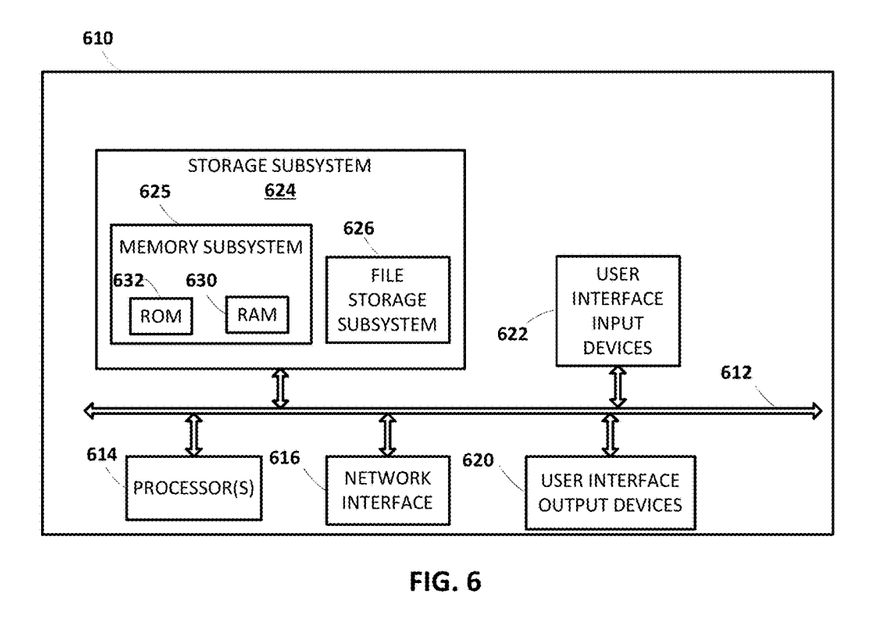
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 300, method 400, and/or to implement one or more aspects of computing device 120, processor 502, engine 140A, and/or engine 140B. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
receiving, from a three-dimensional vision sensor of a robot, a group of data points sensed by the three-dimensional vision sensor;
retrieving, by one or more processors, a three-dimensional planar model that approximates a plurality of surfaces of an object, the planar model defining a plurality of planar shapes modeled relative to one another in a three-dimensional space,
wherein the object is a pallet that includes a plurality of stringers and wherein a first planar shape of the planar model approximates a first stringer surface of a first stringer end of a first stringer of the stringers and a second planar shape of the planar model approximates a second stringer surface of a second stringer end of a second stringer of the stringers, and
wherein the first stringer end and the second stringer end are both on a same side of the pallet;
calculating, by one or more of the processors and for each of a plurality of projections of the model to the data points, differences between the planar model and the data points for a corresponding projection of the projections;
determining, by one or more of the processors, that a projection of the projections satisfies a threshold based on the differences between the planar model and the data points for the projection; and
determining, by one or more of the processors, an object pose for the object relative to the robot based on a planar model pose of the planar model at the projection that satisfies the threshold.

2. The method of claim 1, further comprising adjusting the robot based on the determined object pose.

3. The method of claim 2, wherein the planar model further defines an action area relative to one or more of the planar shapes and wherein adjusting the robot is further based on the action area defined by the planar model.

4. The method of claim 3, wherein the robot includes forks coupled to an elevator, and wherein adjusting the robot includes adjusting a robot pose of the robot to position the forks to encounter the action area.

5. The method of claim 1, wherein the planar model does not approximate any surfaces of the first stringer and the second stringer that are in addition to the first stringer surface and the second stringer surface.

6. The method of claim 1, wherein the pallet further includes a plurality of deckboards coupled to the stringers and wherein a third planar shape of the planar model approximates a deckboard of the deckboards, wherein the deckboard is more proximal to the first stringer end and the second stringer end than any other of the deckboards are to the first stringer end and the second stringer end.

7. The method of claim 6, wherein the planar model does not approximate any surface of at least one of the deckboards.

8. The method of claim 1, wherein a majority of the surfaces modeled by the planar model are modeled by the planar shapes.

9. The method of claim 8, wherein a total quantity of the planar shapes defined by the model is less than fifteen.

10. The method of claim 1, wherein all of the surfaces modeled by the planar model are modeled by the planar shapes.

11. The method of claim 1, wherein the planar model is not computed from any three-dimensional scan data.

12. The method of claim 11, wherein the planar model is generated based on human input provided via one or more user interface input devices.

13. The method of claim 1, wherein the planar shapes are all polygons.

14. The method of claim 13, wherein the polygons are all four-sided.

15. The method of claim 1, further comprising:
translating an origin point of the planar model to a data point of the group of data points; and
generating each projection of a group of the projections based on a different rotation of the planar model when the origin point of the planar model is translated to the data point.

16. A robot, comprising:
at least one non-transitory computer readable storage medium storing a three-dimensional planar model that approximates surfaces of an object, the planar model defining a plurality of planar shapes modeled relative to one another in a three-dimensional space,
wherein the object is a pallet that includes a plurality of stringers and wherein a first planar shape of the planar model approximates a first stringer surface of a first stringer end of a first stringer of the stringers and a second planar shape of the planar model approximates a second stringer surface of a second stringer end of a second stringer of the stringers, and
wherein the first stringer end and the second stringer end are both on a same side of the pallet;
a three-dimensional vision sensor; and
one or more processors in communication with the non-transitory computer readable storage medium and receiving data generated by the three-dimensional vision sensor, wherein the one or more processors are configured to:
receive a group of data points sensed by the three-dimensional vision sensor;
calculate, for each of a plurality of projections of the model to the data points, differences between the planar model and the data points for a corresponding projection of the projections;
determine that a projection of the projections satisfies a threshold based on the differences between the planar model and the data points for the projection;
determine an object pose for the object relative to the robot based on a planar model pose of the planar model at the projection that satisfies the threshold; and
provide, to one or more actuators of the robot, control commands that are based on the determined object pose.

17. The robot of claim 16, wherein the robot includes forks coupled to an elevator, and wherein the control commands adjust a robot pose of the robot to position the forks to encounter fork holes of the pallet.

18. The robot of claim 16, wherein a majority of the surfaces modeled by the planar model are modeled by the planar shapes.

19. The robot of claim 16, wherein all of the surfaces modeled by the planar model are modeled by the planar shapes.

20. The robot of claim 16, wherein the planar model is not computed from any three-dimensional scan data.

21. At least one non-transitory computer-readable medium comprising instructions that, in response to execution of the instructions by one or more processors, cause the one or more processors to perform the following operations:

receiving, from a three-dimensional vision sensor of a robot, a group of data points sensed by the three-dimensional vision sensor;

retrieving a three-dimensional planar model that approximates a plurality of surfaces of an object, the planar model defining a plurality of planar shapes modeled relative to one another in a three-dimensional space, wherein the object is a pallet that includes a plurality of stringers and wherein a first planar shape of the planar model approximates a first stringer surface of a first stringer end of a first stringer of the stringers and a second planar shape of the planar model approximates a second stringer surface of a second stringer end of a second stringer of the stringers, and wherein the first stringer end and the second stringer end are both on a same side of the pallet;

calculating, for each of a plurality of projections of the model to the data points, differences between the planar model and the data points for a corresponding projection of the projections;

determining that a projection of the projections satisfies a threshold based on the differences between the planar model and the data points for the projection; and determining an object pose for the object relative to the robot based on a planar model pose of the planar model at the projection that satisfies the threshold.

* * * * *